Feb. 21, 1950     P. GANZINOTTI     2,498,365
METHOD AND APPARATUS FOR MAKING BEADS OR THE LIKE
Filed Jan. 28, 1944     2 Sheets-Sheet 1
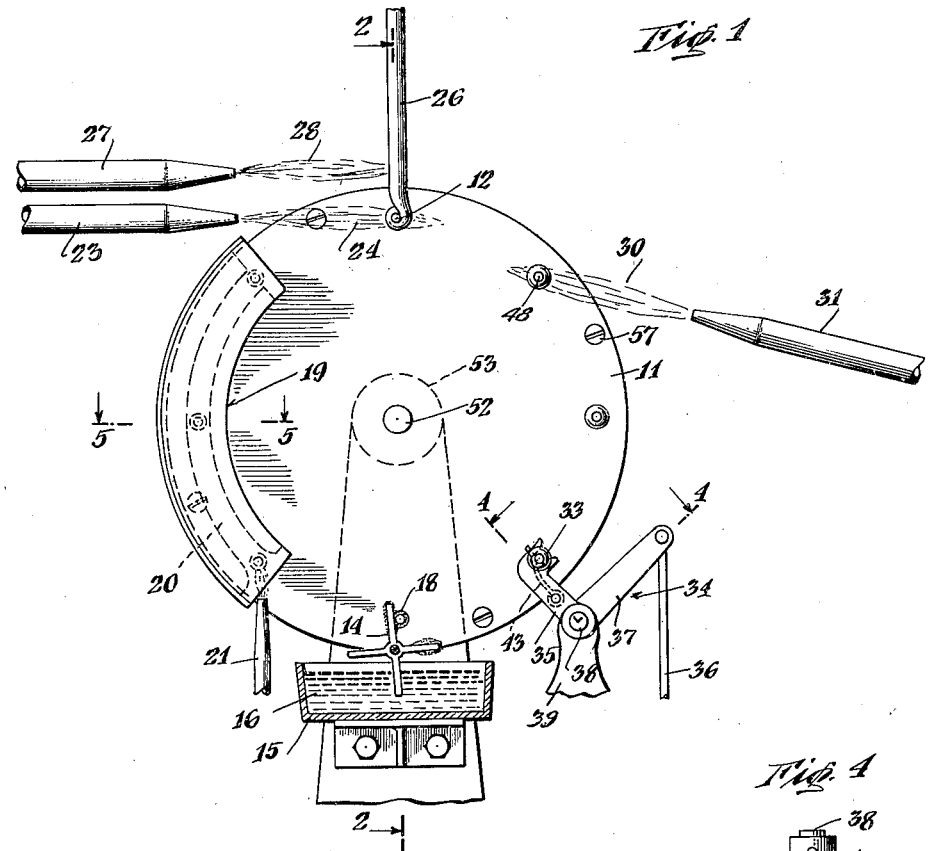
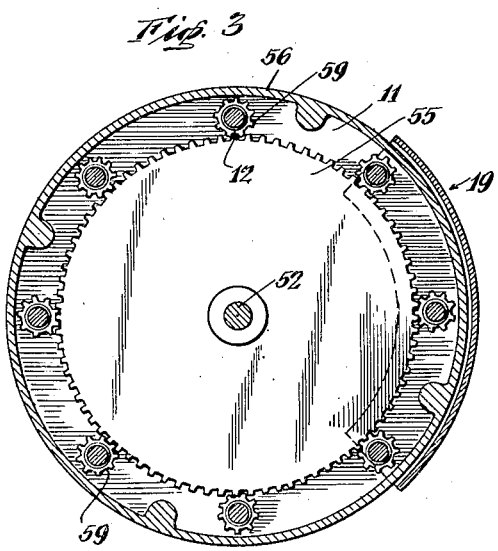
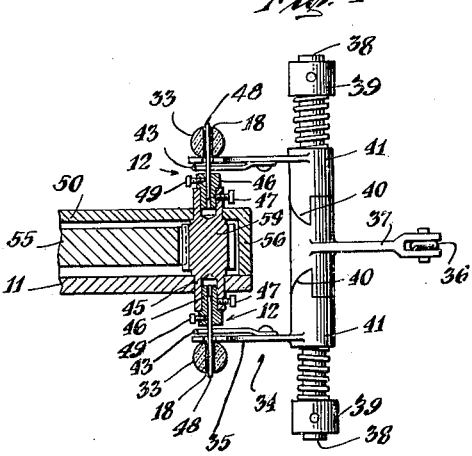
INVENTOR.
Paul Ganzinotti
BY
Charles W. Neill
ATTORNEY

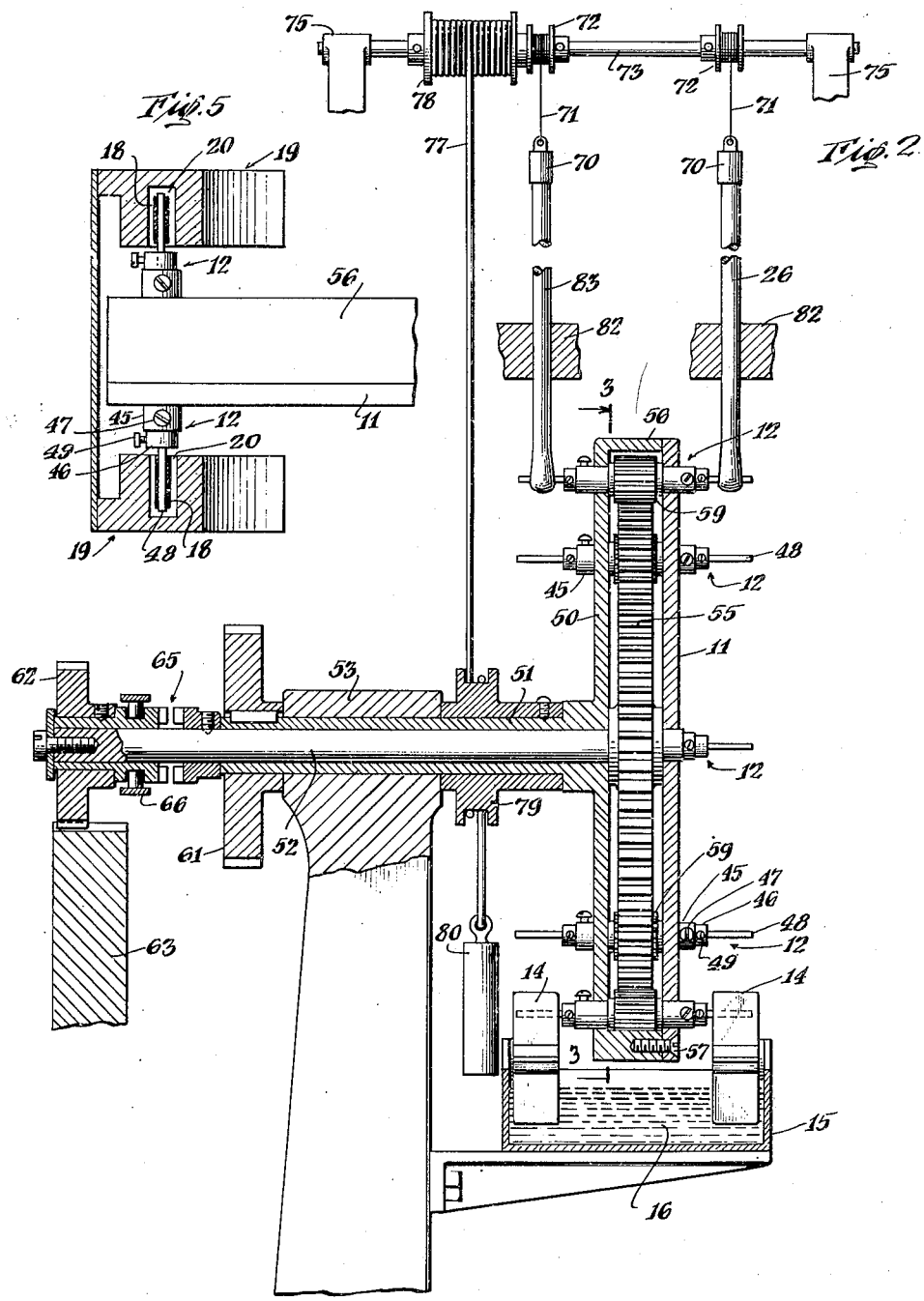

Patented Feb. 21, 1950

2,498,365

UNITED STATES PATENT OFFICE 2,498,365

METHOD AND APPARATUS FOR MAKING BEADS OR THE LIKE

Paul Ganzinotti, Union City, N. J., assignor to Hudson Pearl Company, Union City, N. J., a copartnership Application January 28, 1944, Serial No. 520,124

9 Claims. (Cl. 49—7)

1

This invention relates to a method and apparatus for making round articles from fused material. The invention is intended primarily for making glass beads, but can be used for making other round articles such as buttons or the like.

One object of the invention is to provide an improved machine in which round articles are formed on a spindle and ejected from the spindle when hard so that the same spindle can be used repeatedly. This object is attained by coating the spindle with a liquid, preferably a paste, that is made of some substance or mixture that does not bond to the spindle but can be wiped from the surface of the spindle when dry.

In accordance with one feature of the invention, coating material is applied to a spindle and then passed through an oven and baked to form a hard base for receiving molten glass, or other fused material from which the article is to be made.

Another object of the invention is to provide a simplified operating mechanism for moving a spindle along a predetermined path, preferably a circular path, with continuous motion, and for rotating the spindle during such movement. The speed of rotation is fast enough to shape a fused globule by centrifugal force. When making a spherical bead, the spindle is rotated sufficiently fast to cause irregularities in the viscous material to be smoothed out while a flame is played on the surface of the material to obtain a smoother surface. When making beads or buttons that are to have a spheroid or other flattened form, the spindle is rotated at a higher speed. Distortion of the molten mass by the jet action of the flame that plays against it can be used for shaping, but ordinarily a soft flame is used which does not exert any mechanical influence on the molten mass that has been gathered by the spindle.

Another feature of the invention relates to the construction of the spindle which is composite and made with a pin on which the molten material is gathered, and a pin holder detachably retained in a shaft that rotates the assembly. The pin is removable from the holder and the construction is such that broken or damaged pins can be removed from a multi-spindle machine without interfering with the progressive movement of the spindles and with only a minimum pause in their rotation. Still another feature relates to a simplified construction by which a number of spindles receive glass, or other fused material, from a common supply, and the beads formed on these spindles are ejected successively

2 by a common ejector apparatus. In the preferred embodiment of the invention, two separate sets of spindles are provided and driven by the same operating mechanism. This doubles the capacity of the machine.

Other objects, features and advantages of the invention will appear or be pointed out as the specification proceeds.

In the drawing, in which like reference characters indicate corresponding parts in all the views, Fig. 1 is a front elevation of a bead making machine embodying this invention;

Fig. 2 is a sectional view taken on the line 2—2 of Fig. 1;

Fig. 3 is a fragmentary detail view, this view being taken on the line 3—3 of Fig. 2;

Fig. 4 is an enlarged view showing a portion of the ejector and cleaning apparatus of Fig. 1, and showing also the operating apparatus of this mechanism, a portion of this figure being a section on the line 4—4 of Fig. 1; and Fig. 5 is an enlarged view illustrating the ovens for baking the coating on the spindles, the ovens being shown in section along the line 5—5 of Fig. 1.

The machine includes a disc or carrier 11 and there are a plurality of spindles 12 extending from the face of the carrier. The machine shown in Fig. 1 has eight such spindles located near the periphery of the disc 11 and at equal angular spacing.

The disc 11 rotates at a constant speed so that each of the spindles 12 is moved along a circular path. There is a coating applicator 14 at the bottom of the disc in position to be struck by each of the spindles 12. This applicator may be of various forms, and the one shown in the drawing is merely representative of means for applying a liquid or paste coating to the spindles as they pass. The applicator 14 is a paddle wheel that dips into a reservoir 15 containing the coating material 16, which is preferably in the form of a paste.

Various materials, or mixtures of materials, can be used for coating the spindles. A paste made up of lime, sodium silicate, and water is suitable. Lime and water alone may also be used. The necessary characteristic of the coating material is that it must be one that will not bond to the spindle under the influence of high temperature, and for most purposes it is desirable to have a material that does not bond to the glass or other substance from which the bead is made. It is, of course, necessary, for the coating to remain on the spindle during the bead making operation, and in describing the coating as one that does not "bond" to the spindle it is meant that it does not stick or adhere so firmly that it cannot be wiped off. When using a paste made of lime and water, or lime and sodium silicate with water, the coating bakes into a hard sleeve around the spindle and provides an excellent base for receiving fused glass, but the sleeve is easily broken loose from the spindle when pressure is exerted against the finished bead in a direction lengthwise of the spindle.

Fig. 1 shows the lowermost spindle 12 in contact with a blade of the applicator and in the process of receiving a coating 18 from the applicator. Ovens 19 are used to dry the coating gradually. Each of these ovens 19 has an arcuate channel 20, best shown in Fig. 5, and each oven is preferably heated by a gas flame from a burner 21. Products of combustion from the burner 21 pass up the channel 20 as a flue. The ovens 19 extend far enough along the path of travel of the spindles 12 so that the coating 18 is thoroughly dry by the time each spindle emerges from the outlet end of the channel 20.

A hard coating such as lime and sodium silicate, will crank off the spindles when it comes in contact with fused glass unless the coating is heated to a high temperature, of the order of red heat. A burner 23 is located in position to direct a heating flame 24 against the coating on the spindles, to heat the coating red hot, during the travel of the spindles from the ovens 19 to the region at which the spindles pick up a supply of fused glass.

A glass rod 26 is fed downward into the path of the spindles 12. There is a burner 27 that directs a gas flame 28 against the lower end of the rod 26, and the heat supplied by the flame 28 is so proportioned to the rate of feed of the glass rod 26 that the glass is heated to a plastic, or semi-plastic, condition by the time it comes into the path of the spindles 12. The flame 24 provides the final heat that is applied to the glass 26 while the glass is being gathered on the spindles 12.

As the carrier disc 11 continues to rotate, the spindle 12 in contact with the glass rod 26 draws a globule of glass from the rod. As this globule is carried away from the glass rod, it is kept in a fused condition first by the heating flame 24 which projects some distance beyond the lower end of the glass rod 26, and then by a flame 30 from a burner 31. The flame 30 keeps the surface of the glass globule fused until the globule becomes symmetrically formed on the spindle. Rotation of the spindles produces centrifugal force that causes the molten material gathered by each spindle to assume a symmetrical shape around the axis of the spindle.

There are burners similar to the burners 23, 27 and 31 on the other side of the machine for cooperation with spindles and a glass supply on that side of the machine.

In each illustrated embodiment of the invention, the spindle has a single central pin on which the bead is formed. In making buttons, where two or more holes are desired, the spindle is provided with two or more pins and the axis of rotation of the spindle is a central line equidistant from the different pins. It will be apparent that similar considerations are involved in making glass beads or buttons or like articles on a machine of the character of this invention. When referring to "beads" in the subsequent description and claims, the term is used in a broad sense to indicate beads or like articles, such as buttons.

After the fused globule passes beyond the flame 30 it hardens into a bead 33. Stripper or ejector apparatus, indicated generally by the reference character 34, is located at sufficient distance beyond the flame 30 so that the beads 33 are thoroughly hardened before they reach the ejector apparatus.

The ejector apparatus is shown in Figs. 1 and 4 and includes an arm 35 at the front of the machine provided with a forked end that extends on opposite sides of a pin of the spindle 12 at a point behind the bead 33. When the bead and spindle reach the position shown in Fig. 1 with the forked end of the arm 35 embracing the spindle, a reach rod 36 is operated by automatic mechanism not illustrated, and this reach rod 36 pulls down on a crank 37 mounted on a shaft 38 carried by supports 39. The hub of the crank 37 has cam faces 40 at both ends that serve to displace sleeves 41 in opposite directions. The arm 35 is connected with one of the sleeves 41 and is moved lengthwise of the axis of the spindle 12 when that sleeve 41 is displaced by the cam face 40. This movement of the arm 35 ejects the bead 33 from the spindle and moves the arm 35 beyond the end of the spindle so that the spindle can pass the ejector apparatus.

In order to prevent the spindles from collecting an irregular coating of lime and sodium silicate, or whatever other coating material is used, it is desirable to clean the spindle each time it is used. In the illustrated embodiment of the invention, this is done by a spring wire 43 that is secured to the back of the ejector arm 35 that bears against one side of the spindle. As the arm 35 moves lengthwise of the spindle, the cleaning wire 43 wipes off any coating material that is not ejected with the bead. It is sufficient to have the cleaning wire 43 bear against only one side of the spindle 12 because the spindle 12 rotates rapidly and the entire surface on which the coating was applied is wiped by the wire 43. There is similar ejector apparatus at both ends of the spindle 12 in the illustrated embodiment of the invention, and the corresponding parts are indicated by the same reference characters.

The composite construction of one of the spindles 12 is illustrated in Fig. 4. The spindle includes a shaft 45 that has recesses in its opposite ends. If these recesses are deep enough to meet, the shaft 45 will be hollow. At each end of the shaft 45 a bushing or pin holder 46 has one end of a size that fits the recess in the shaft 45 and there is a set screw 47 in the shaft for retaining the pin holder 46 in the recess. It is a feature of the invention that the shaft 45 extends sufficiently beyond the face of the disc 11 so that the set screw 47 is far enough out from the face of the disc 11 to be conveniently manipulated by an attendant standing alongside of the machine.

The pin holder 46 has a central opening into which the pin 48 of the spindle extends, and there is a set screw 49 for clamping the pin 48 in its proper position in the pin holder. When a pin becomes bent or broken, the set screw 48 is released, and the pin holder 46 removed from the machine without stopping the rotation of the carrier disc 11. It is, of course, necessary to temporarily stop the rotation of the spindles. A new pin holder, with a pin 48 in correct position, is inserted.

After a pin holder 46 is removed, the set screw 49 is released and the broken or damaged pin 48 removed. A new pin is then inserted with the use of a suitable gauge for determining how far the pin extends from the end of the pin holder. With the pin in correct position, the set screw 49 is tightened and the assembly is then ready for insertion in the machine to replace some other pin that becomes broken or damaged. There is a shoulder on the pin holder for determining how far the pin holder extends into the recess in the end of the shaft 45. It will be apparent that this construction makes provision for having the pin 48 always extend the same distance from the face of the disc 11, and this is important because the pin must extend far enough to extend all the way through the glass bead, but not so far that it will be unable to pass the ejector apparatus 34. The spindle 12 is of similar construction at both ends in the machine illustrated in the drawing, because this machine is designed for operation with two supply sources of fused glass.

The mechanical construction of the machine is shown in Fig. 2. A disc 50 is attached to a sleeve or hollow shaft 51 that surrounds a drive shaft 52. The drive shaft 52 turns freely in the sleeve 51 as a bearing, and the sleeve 51 rotates in a bearing in a support 53 that comprises the main frame of the machine. There is a large central gear 55 keyed to the forward end of the drive shaft 52. The disc has a forwardly extending rim 56 around its periphery, and the front disc 11 is attached to the rim 56 by screws 57. The disc 50 with its rim 56 and the front disc 11 form a housing that encloses the central gear 55 and pinion gears 59.

These smaller gears or pinions 59 mesh with the central gear 55 and are mounted on the shafts 45 of the respective spindles 12. In the illustrated construction, the pinions 59 are an integral part of the shafts 45. Each of the shafts 45 has shoulders that come in contact with the inside faces of the discs 11 and 50 to prevent endwise displacement of the spindles 12.

The housing comprising the discs 11 and 50 is driven by a gear 61 keyed to the rearward end of the sleeve 51. The central gear 55 is driven by a gear 62 to which power is supplied from a driving gear 63. The gear 62 transmits motion to the drive shaft 52 through a clutch 65 that can be disengaged by a yoke 66 whenever it becomes desirable to stop the rotation of the spindles, as for example, when it is necessary to replace a pin.

The glass rod 26 is connected at its upper end to a holder 70 suspended from a cable 71 that wraps around a drum 72 on a shaft 73. The shaft 73 rotates in bearings 75. This shaft 73 is turned by a cable 77 that unwinds from a drum 78 on the shaft. The cable 77 passes around a sheave 79 and has a weight 80 suspended from its lower end. It is the weight 80 that provides the power for turning the shaft 73, but the rate at which the weight 80 moves downward is determined by the speed of rotation of the sheave 79 which is connected to the sleeve 51 and rotates as a unit with the sleeve.

The glass rod 26 is guided by a bearing 82. There is another glass rod 83, guided by a similar bearing, and fed downward in the same manner as the rod 26 for supplying fused glass to pins at the back of the spindles 12. The apparatus for feeding the rod 83 is similar to that for the rod 26 and corresponding parts are indicated by the same reference characters. The rate at which the glass rods are fed downward can be changed by providing a different size drum 78, or by changing the diameter of the sheave 79. Other mechanism can be used for feeding the glass rods 26 and 83, but the feed mechanism is preferably driven from the same apparatus that rotates the discs 11 and 50, so that the same amount of glass is fed downward for each successive spindle regardless of changes in the rate of movement of the spindles along their circular path.

The preferred embodiment of the invention has been described but changes and modifications can be made, and some features of the invention can be used without others without departing from the invention as defined in the claims.

What is claimed is:

1. In the manufacture of circular articles from a fusible material that is viscous at fusing temperature, the steps comprising coating a spindle with a paste made of material that can be wiped from the spindle when dry, drying the paste and driving volatile liquid therefrom by heating the paste gradually until it is baked into a solid coating on the spindle, then heating the baked coating more quickly to a substantially red heat and while so heated applying a viscous mass of the fusible material to the coating on the spindle, rotating the spindle and the viscous mass, shaping the rotating mass to form a circular article, cooling said article, and then stripping the article and coating from the spindle and repeating the cycle with the same spindle.

2. The process of making circular articles from viscous fused material on a rotating spindle, said process comprising coating the spindle with a paste that dries into a solid coating which can be wiped from the spindle, drying the paste and driving volatile liquid therefrom by heating the paste gradually until it is baked to produce a dry base on the spindle then heating the baked coating more quickly to a substantially red heat and while so heated applying a globule of fused material to the coated spindle, shaping the fused material while on the spindle, cooling the shaped material, and after hardening stripping the material from the spindle.

3. In the method of manufacturing glass beads or similar articles by gathering molten glass or plastic on a rotating spindle that has been coated so that the glass does not bond to the spindle and the hardened bead can be pushed off the spindle, the improvement which comprises applying the coating to the spindle as a paste, drying the paste and driving volatile liquid therefrom by heating the coating gradually until it is baked into a hard, dry base and then heating the coating rapidly to a higher temperature before it comes into contact with the molten glass so as to obtain adherence of the glass to the coating and to prevent the coating from cracking on the spindle.

4. The method of forming a glass article on a spindle which method comprises rotating the spindle continuously about its axis while moving it transversely of its axis in a circular path, applying a liquid coating to the spindle at one region of the circular path, subjecting the coated spindle to a baking heat along an extensive arc of the spindle travel long enough to dry and bake the coating at a rate which drives off any volatile liquid gradually, applying a final and more rapid heating to the baked coating until the coating is raised to a red heat, bringing the spindle while so heated into contact with a mass of glass that has been heated to at least a semi-fused state so that a globule of glass is picked up by the spindle, maintaining heat on the globule after it moves away for the mass to keep said globule semi-fluid while it is being shaped, the speed of rotation of the spindle being enough to shape the globule by centrifugal force, moving the globule along the circular path of the spindle beyond the heat, while said globule cools to a hard bead, ejecting the bead from the spindle by a force exerted lengthwise of the spindle, cleaning the coating from the spindle, and then repeating the cycle with the same spindle.

5. A bead-making machine comprising a plurality of spindles, a carrier for the spindles, apparatus for moving the carrier to traverse the spindles along a predetermined course, an applicator for coating each spindle as it passes one region along the course, means for applying a globule of fusible material to each spindle at another region, and a bead ejector at still another region along said course and in the path of each spindle as the spindle approaches the bead ejector region, and apparatus for moving the bead ejector to push the bead off each spindle and to shift the ejector out of the path of the spindle from which the bead has been pushed.

6. A machine for making round articles from fusible material, said machine including a carrier, a spindle extending from the carrier and rotatable with respect to the carrier, apparatus for operating the carrier to move the spindle along a path, means for supplying fusible material to the spindle at one point along its path, an ejector that moves lengthwise of the spindle, said ejector being located along the path of the spindle beyond the point at which the material is supplied to the spindle and a scraper in the path of the spindle and with respect to which the spindle is rotatable to clean substantially all of the coating from each spindle.

7. A machine for making round articles from fusible material, said machine including a carrier, a spindle extending from the carrier and rotatable with respect to the carrier, apparatus for operating the carrier to move the spindle along a path, an applicator for putting a non-bonding coating on the spindle at a region along the path of travel of the spindle, means for supplying a globule of fusible material to the spindle at another region further along the path, and means still further along the path of travel of the spindle for removing a hardened article formed from said globule, said means including a scraper with respect to which the spindle rotates for cleaning hardened coating material from the spindle preparatory to a repetition of the same cycle by said spindle.

8. A bead-making machine including a carrier disc, spindles extending from a face of the carrier disc at angularly spaced locations around said disc near the disc periphery, apparatus for rotating the disc at relatively slow speed, and apparatus for rotating the spindle with respect to the disc at a rate fast enough to shape by centrifugal force the fused material gathered on a spindle, an applicator that coats each of the spindles as the spindle passes a given location during the rotation of the carrier disc, an oven having an arcuate recess along which each spindle moves after coating to bake the coating on the spindle, a burner for supplying a heating flame at the end of the oven for heating the coating on the spindle to red heat, means for supplying fused bead material with which the spindle comes in contact while at red heat, a burner for maintaining the bead material fused during the first part of its travel beyond the region at which the spindle receives its supply of fused material, a bead ejector at a region where the bead has hardened, apparatus for moving the ejector lengthwise of the spindle as each spindle reaches the ejector, and a cleaner in the path of the spindle in position for cleaning hardened coating from the spindle after the bead is ejected and preparatory to starting a new cycle.

9. A machine in which a spindle is used in repeated cycles for making glass beads or other round articles from fused material, said machine comprising a movable carrier, a spindle extending from the movable carrier, an applicator for coating the spindle with a layer of paste, means for supplying fused material to the spindle at one region during the movement of the carrier, and heating means for baking the coating and raising the temperature of the coating to a high temperature of the order of red heat just before the spindle receives the supply of fused material.

PAUL GANZINOTTI.

REFERENCES CITED

The following references are of record in the file of this patent:

UNITED STATES PATENTS

| Number | Name | Date |
| --- | --- | --- |
| 601,062 | Neuss | Mar. 22, 1898 |
| 857,151 | Booth | June 18, 1907 |
| 1,391,527 | Chase | Sept. 20, 1921 |
| 1,466,575 | Bonnet | Aug. 28, 1923 |
| 1,574,383 | Fraser | Feb. 23, 1926 |
| 1,580,076 | Paisseau | Apr. 6, 1926 |
| 1,789,014 | Millar | Jan. 13, 1931 |
| 2,348,035 | Synek | May 2, 1944 |
| 2,348,036 | Synek | May 2, 1944 |

FOREIGN PATENTS

| Number | Country | Date |
| --- | --- | --- |
| 630,452 | France | Oct. 23, 1927 |